United States Patent [19]
Wood

[11] Patent Number: 5,564,394
[45] Date of Patent: Oct. 15, 1996

[54] CONTROL VALVE

[75] Inventor: Christopher Wood, Gillingham, England

[73] Assignee: Lucas Industries public limited company, West Midlands, England

[21] Appl. No.: 332,926

[22] Filed: Nov. 1, 1994

[30] Foreign Application Priority Data

Nov. 5, 1993 [GB] United Kingdom ............ 9322850

[51] Int. Cl.⁶ .................................................. F02M 37/04
[52] U.S. Cl. ............... 123/506; 123/450; 251/129.07
[58] Field of Search .............................. 123/506, 447, 123/450; 251/129.07, 129.15, 175, 284, 82

[56] References Cited

U.S. PATENT DOCUMENTS

| | | | |
|---|---|---|---|
| 3,759,239 | 9/1973 | Regneault et al. | |
| 4,385,610 | 5/1983 | Leblanc | 123/447 |
| 4,595,170 | 6/1986 | Livet | 251/129.07 |
| 4,647,008 | 3/1987 | Shirai | 251/129.07 |
| 4,832,312 | 5/1989 | Linder | 251/129.07 |
| 4,840,155 | 6/1989 | Karle | 123/506 |
| 4,852,853 | 8/1989 | Toshio | 251/129.07 |
| 5,005,548 | 4/1991 | Rembold et al. | |
| 5,027,776 | 7/1991 | Nicol | 123/450 |
| 5,038,826 | 8/1991 | Kabai et al. | |
| 5,082,180 | 1/1992 | Kubo | 251/129.07 |
| 5,347,970 | 9/1994 | Pape | 123/506 |
| 5,363,824 | 11/1994 | Bonse | 123/506 |

FOREIGN PATENT DOCUMENTS

| | | | |
|---|---|---|---|
| 3211680 | 10/1983 | Germany | 123/506 |
| 2017266 | 3/1979 | United Kingdom. | |

*Primary Examiner*—Carl S. Miller
*Attorney, Agent, or Firm*—Trexler, Bushnell, Giangiorgi & Blackstone, Ltd.

[57] ABSTRACT

A control valve includes a valve member shaped for engagement with a seating which is defined about a flow passage. The valve member is movable between the open and closed positions by an actuator. Formed in the valve member is a blind drilling in which is located a plunger engageable with a fixed reaction surface external of the valve member. The inner end of the drilling communicates with a passage which communicates with the flow passage. The valve member is slidable in a bore which adjacent the seating is of enlarged diameter to define a recess which communicates with a further flow passage.

10 Claims, 2 Drawing Sheets

1

CONTROL VALVE

This invention relates to a control valve for controlling fluid flow between a pair of passages and of the kind comprising a valve member movable into engagement with a seating to prevent fluid flow between the passages and actuator means coupled to the valve member for effecting movement of the valve member towards and away from the seating.

The object of the invention is to provide such a valve in a simple and convenient form.

According to the invention a control valve for controlling fluid flow between a pair of passages comprises a cylindrical valve member slidable in a bore, a seating defined in the bore about a narrower portion of the bore which serves as one of the flow passages, the valve member being shaped for co-operation with the seating, a recess defined in the bore adjacent the seating, said recess communicating with the other of the flow passages, and actuator means coupled to the valve member, a blind drilling formed in the valve member, a plunger slidable in the drilling, said plunger being engageable with a fixed reaction surface and a passage formed in the valve member, said passage communicating with the inner end of the drilling and opening to the exterior of the valve member at a position to communicate with said one flow passage.

An example of a control valve in accordance with the invention will now be described with reference to the accompanying drawings in which.

Figure 1:
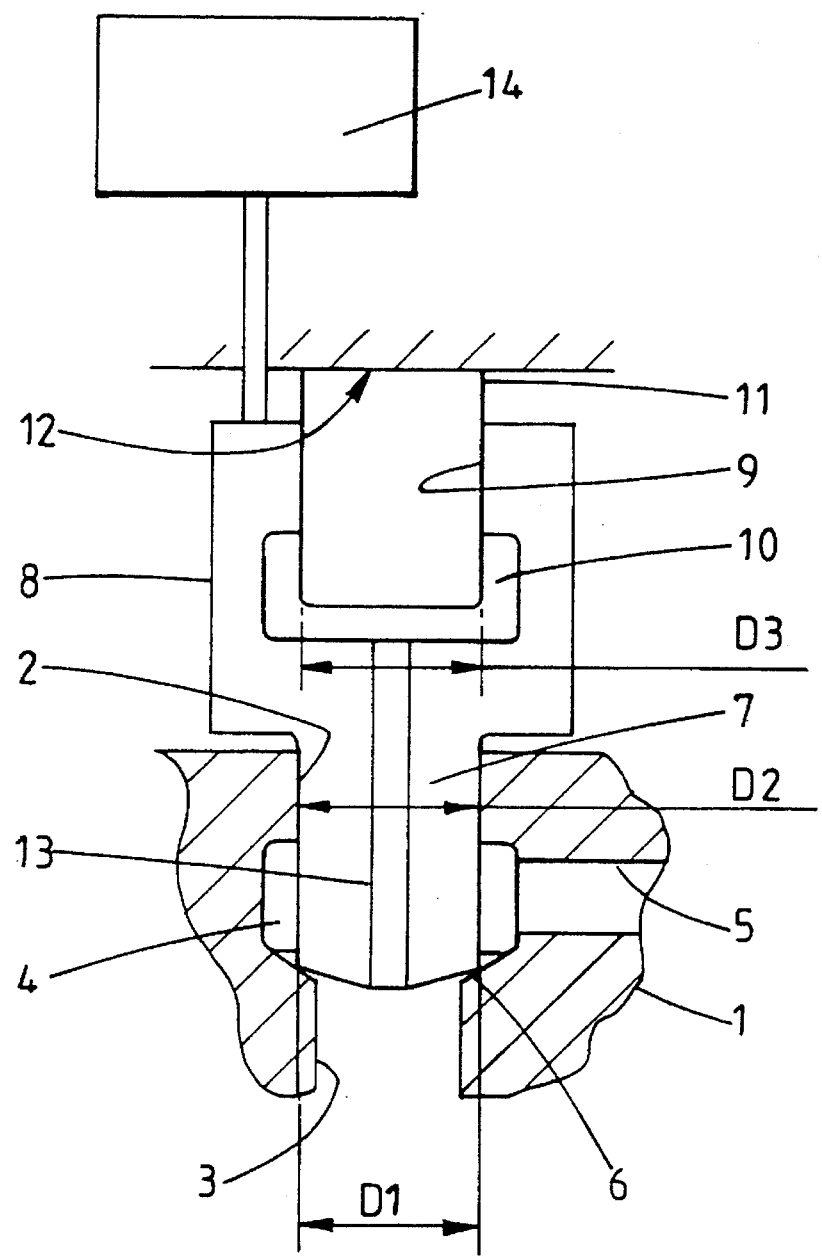
FIG. 1 shows a part sectional side elevation of the valve.

With reference to FIG. 1, the valve comprises a valve body 1 in which is defined a stepped bore. The wider portion of the bore is assigned the reference numeral 2 and the narrower portion of the bore the reference numeral 3. In the wider portion of the bore there is formed an annular recess 4 which is in constant communication with a passage 5. At the junction between the narrower portion of the bore and the recess there is defined a frusto-conical seating 6.

Slidable within the wider portion 2 of the bore is a cylindrical valve member 7 which exterior of the body 1 is provided with an enlarged head 8. The inner end of the valve member is shaped for cooperation with the seating 6 and for this purpose is machined to frusto-conical form with a cone angle which is larger than the cone angle of the seating so that engagement between the valve member and the seating takes place at the outer peripheral surface of the valve member.

Formed in the head 8 is a drilling 9 which opens into a chamber 10 and slidable within the drilling is a plunger 11 which is engagable with a reaction surface 12. The chamber 10 by way of a passage 13 communicates with the narrower portion 3 of the bore, this portion of the bore serving as the other flow passage for fluid controlled by the valve.

In the illustrated example the diameter of the plunger 11 is represented by the dimension D3, the diameter of the wider portion of the bore is represented by the dimension D2 and the diameter of the seat line between the valve member and the seating is represented by the dimension D1. In the example D1, D2 and D3 are equal.

The valve member is coupled to an actuator means 14 which may for example be an electromagnetic actuator or it may be a mechanical actuator or a fluid pressure operated actuator. In the case of an electromagnetic actuator the head 8 may constitute an armature and a solenoid winding can be provided about the head or in end relationship thereto. In the case of a fluid pressure actuator the head 8 may form a double acting piston slidable in a cylinder to the opposite ends of which fluid under pressure can be applied to effect movement of the valve member.

In use, when the valve member 7 is in the closed position and the passage 5 is connected to a source of fluid under pressure, since D1 is equal to D2, there will be no fluid pressure forces acting on the valve member in an axial direction. Similarly if the passage constituted by the narrower end 3 of the bore is connected to a source of fluid under pressure, the axial forces acting on the valve member will be balanced since the dimensions D1, D2 and D3 are equal. If the valve member is moved to the open position so as to permit fluid flow between the passages, the axial forces acting on the valve member will again be balanced. The valve as described therefore can be operated by a low power actuator even when the pressure of fluid delivered by the source is high and the valve therefore has particular use in high pressure installations such for example as the fuel system of a compression ignition engine.

If the relationship between D1, D2 and D3 is altered the valve member under some operating situations will no longer be pressure balanced. For example, if D3 is made larger than D1 and D2 the valve member will be pressure actuated into contact with the seating by the fluid pressure in the narrower portion of the bore but so far as the pressure in the passage 5 is concerned with the valve member in the closed position no axial force will be developed on the valve members. If D3 is made smaller than D1 and D2 the valve member will be pressure actuated to the open position. If D1 is made smaller than D2 but still equal to D3 then so far as the pressure in the passage 5 is concerned when the valve member is in the closed position, an axial force will be developed on the valve member acting to urge it away from the seating. The valve member will however remain balanced so far as the pressure in the narrower portion of the bore is concerned.

The valve member when moved by the actuator will cause fluid flow through the passage 13 and the rate of movement of the valve member can be controlled by varying the size of this passage.

Figure 2:
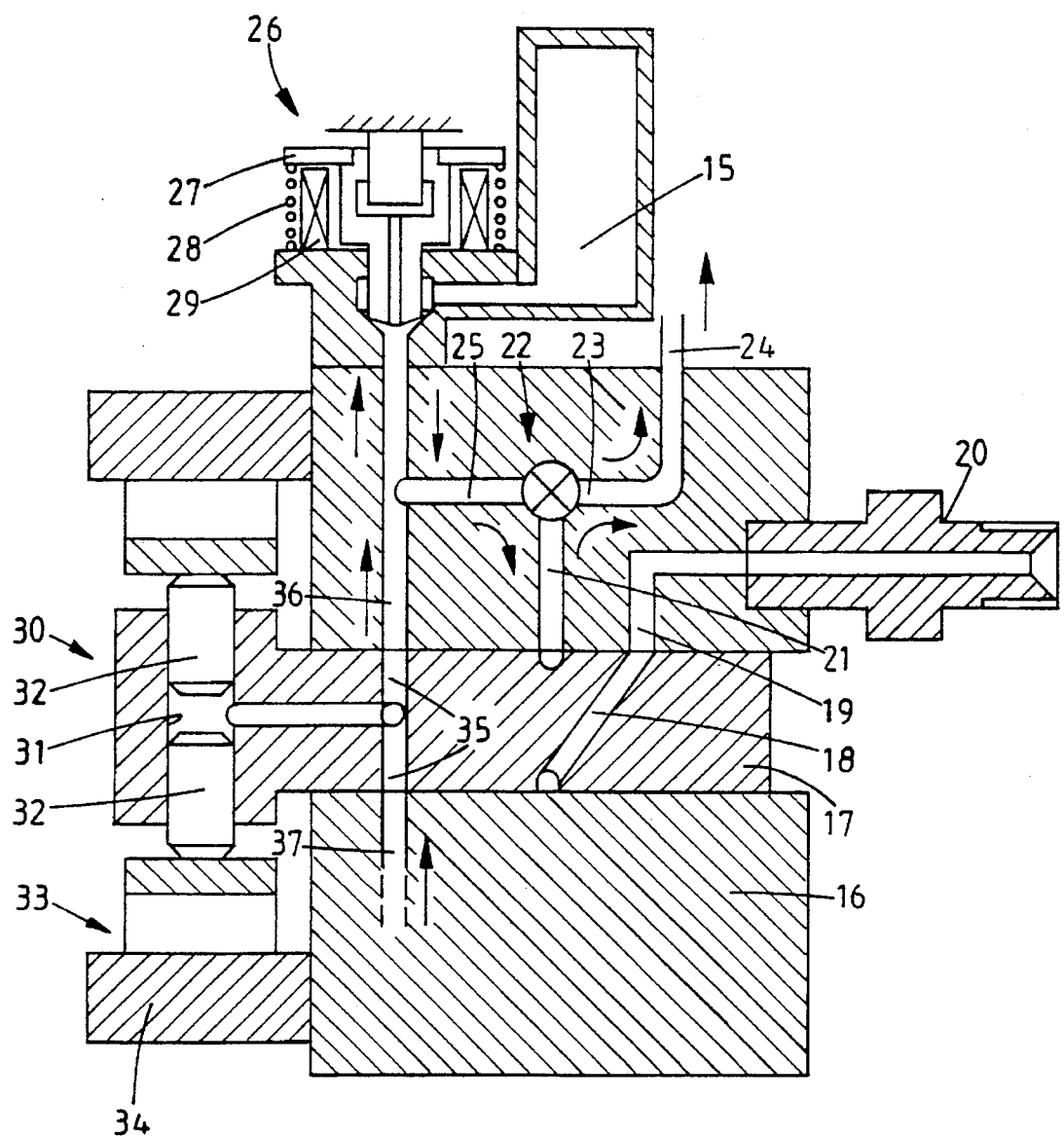
FIG. 2 shows a sectional side elevation of a fuel system incorporating the valve of FIG. 1.

FIG. 2 shows the application of the valve shown in FIG. 1 in a fuel system for supplying fuel to an internal combustion engine. The fuel system is described in our pending application EP-A-94306529.2 comprising an accumulator 15 in which is stored liquid fuel at high pressure, the pressure being sufficiently high to open the fuel pressure actuated valve members of the fuel injection nozzles of the engine. In order to charge the accumulator and also to distribute fuel from the accumulator to the injection nozzles in turn there is provided a pump/distributor unit which comprises a body 16 in which is journaled a rotary cylindrical distributor member 17. The distributor member is driven in timed relationship with the associated engine by means of a drive shaft not shown. Formed in the distributor member is a delivery passage 18 and this can register in turn with a plurality of outlet ports 19 which are formed in the body and which are connected to outlets 20 respectively the outlets in use being connected to the injection nozzles respectively of the associated engine. Each outlet may be provided with the usual form of delivery valve. The passage 18 communicates with a circumferential groove formed in the periphery of the distributor member and this groove is in constant communication with a common port 21 of a two way valve 22. The valve has a further port 23 which is connected to a drain passage 24 and a still further port 25 which is connected through an ON/OFF valve 26 to the accumulator 15. The valves 22 and 26 are conveniently electrically actuated the electrical power being supplied from a control system which is responsive to various engine operating parameters and a desired operating parameter.

The valve 26 takes the form of the valve shown in FIG. 1 with the head 8 having an armature 27 mounted thereon. The valve member is spring biased to the open position by means of a coiled compression spring 28. The solenoid which when energised attracts the armature to move the valve member to the closed position is indicated at 29.

In order to charge the accumulator a high pressure pump generally indicated at 30 is provided and this comprises a transverse bore 31 formed in a portion of the distributor member which extends from the body 16. Slidably mounted in the bore is a pair of pumping plungers 32 which at their outer ends, engage cam followers 33 respectively each cam follower including a roller which engages the internal peripheral surface of an annular cam ring 34. The cam ring is provided in the case of an engine having four cylinders, with four equi-angularly spaced cam lobes which impart inward movement to the plungers as the distributor member is rotated. An additional pair of plungers may be provided and these would be located in a further bore which for the application described would intersect the bore 31 at right angles. For a six cylinder engine the further bore would be located in a plane spaced from the plane containing the bore 31 by 60° and the cam ring would have six cam lobes.

For a five cylinder engine the cam ring would be provided with five cam lobes and five plungers may be provided in individual bores or three plungers may be provided again in individual bores with appropriate spacing of the bores and with one plunger being larger than the other two in order to achieve balance of the forces acting on the distributor member.

Returning to the example, the portion of the bore 31 which lies intermediate the plungers is connected to four equi-angularly spaced passages 35 which open onto the periphery of the distributor member so as to register in turn with a transfer port 36. The transfer port is connected to a point intermediate the valves 22 and 26. In addition, the passages 35 can register in turn with a fuel supply port 37 this port being connected to the outlet of a low pressure pump. This pump may have a rotary part carried by the distributor member 17 or the rotary part of the pump may be driven directly by the drive shaft.

Ignoring for the moment the action of the high pressure pump 30 and assuming that the accumulator 15 is charged with fuel. As the distributor member rotates the delivery passage 18 will move into register with an outlet port 19. Before this communication is established the valve 22 is placed in a first position in which the ports 21 and 25 are in communication with each other the port 23 therefore being effectively closed. When delivery of fuel is required the valve 26 is opened by de-energising the solenoid 29, and fuel from the accumulator then flows through the valves 26 and 22 and to the selected outlet 20. When sufficient fuel has been supplied to the engine the valve 22 is switched to its second position in which the port 25 is closed, and the port 21 is connected to the port 23. This connection causes a reduction of the fuel pressure within the port 21 and the delivery passage and the outlet port 20 so that the valve in the associated fuel injection nozzle can close quickly. As the distributor member further rotates the passage 18 moves out of register with the outlet port 19 and prior to the next delivery of fuel the valves are switched so that the valve 26 is closed and the valve 23 is in its first position in which the ports 21 and 25 are interconnected. Thus the valve 26 controls the supply of fuel from the accumulator and determines the start of delivery of fuel to the engine and the valve 22 serves to terminate the supply of fuel to the engine.

Considering now the operation of the high pressure pump 30. The main purpose of this pump is to charge the accumulator with fuel but in the particular example it may also be used to supply an initial quantity of fuel to the engine at a reduced rate. In order to achieve this, as the delivery passage 18 moves into register with an outlet port 19, one of the passages 35 moves into register with the transfer port 36 and with the valve 26 closed and the valve 22 in its first state, as the distributor member rotates, the rollers and therefore the plungers 32, will be moved inwardly as the rollers move off the base circle onto the leading flanks of the cam lobes and fuel will be supplied to the engine. When the required volume of fuel has been supplied at the reduced rate, the valve 26 is opened and the remaining flow of fuel to the engine takes place at a high rate from the accumulator 15 as described above. The further fuel displaced by the high pressure pump flows to the accumulator. When the required total quantity of fuel has been supplied to the engine the valve 22 is actuated to close the port 25 as described above and with the valve 26 open the remaining quantity of fuel which is displaced by the plungers during their inward movement, flows into the accumulator 15. As the plungers move over the crests of the cam lobes the passage 35 moves out of register with the transfer port 36 and a further one of the passages 35 moves into register with the fuel supply port 37 so that the plungers are now urged outwardly their maximum extent by a fresh supply of fuel obtained from the low pressure pump. The cycle is then repeated.

In a modification of the system the valve 26 is replaced by a simple non-return valve which can open to allow fuel displaced by the high pressure pump 30 to flow directly to the accumulator 15. Moreover, the port 25 of the valve 22 is connected to the accumulator by way of a restrictor which can be by-passed by means of a by-pass valve of the type shown in FIG. 1. The initiation of fuel delivery in this example is by means of the valve 22 as also is the termination of fuel delivery. When the by-pass valve is closed fuel is delivered at a restricted rate to the associated engine but when the by-pass valve is opened, the fuel flow is at an increased rate.

A plurality of valves of the kind seen in FIG. 1 may be used to control the flow of fuel to respective fuel injection nozzles of an engine fuel system, the fuel being stored at high pressure in an accumulator chamber. The valves maybe an integral part of the respective injection nozzles.

I claim:

1. A fuel system for an internal combustion engine comprising a high pressure cam actuated plunger pump operable in synchronism with an associated engine, a first valve having a first port through which fuel can flow to the engine, a second port which is connected to a drain and a third port is connected to the outlet of the high pressure pump, an accumulator chamber, and a second valve through which the accumulator chamber can be connected to the third port of the first valve, whereby with the second valve closed and the first valve set to connect the first and third ports fuel will be supplied to the engine by the high pressure pump and when the second valve is opened fuel is supplied to the engine from the accumulator chamber, fuel flow to the engine being halted by operation of the first valve to connect the first and second ports said second valve comprising a body defining a cylindrical stepped bore having wider and narrower portions, a seating defined in the bore about the narrower portion of the bore which connects with the third port, a recess defined in the wall of the wider portion of the bore adjacent said seating, said recess communicating with the accumulator chamber, a cylindrical valve member slidably mounted in and guided by the wider portion of the bore, the valve member being shaped at one end for engagement with said seating, the valve member at its opposite end extending from the wider portion of the bore and having an integral enlarged portion thereon, an axial drilling extending inwardly in said enlarged portion from the end thereof remote from the seating, a plunger slidable in said drilling, said plunger engaging a fixed reaction surface and a passage communicating with the inner end of said drilling and opening to the exterior of the valve member at a position to communicate with said one flow passage.

2. A fuel system for an integral combustion engine including a high pressure pump, a first valve having a first port through which fuel can flow to the engine, a second port which is connected to a drain and a third port which is connected to an accumulator chamber by way of a restrictor, a non-return valve through which the high pressure pump is connected to the accumulator chamber, and a second valve connected in parallel with the restrictor, whereby when the first valve is set to connect the first and third ports fuel will be supplied to the engine from the accumulator at a rate depending upon whether the second valve is open or closed, said second valve comprising a body defining a cylindrical stepped bore having wider and narrower portions, a seating defined in the bore about the narrower portion of the bore which is connected to one side of said restrictor, a recess defined in the wall of the wider portion of the bore adjacent said seating, said recess communicating with the other side of said restrictor, a cylindrical valve member slidably mounted in and guided by the wider portion of the bore, the valve member being shaped at one end for engagement with said seating, the valve member at its opposite end extending from the wider portion of the bore and having an integral enlarged portion thereon, an axial drilling extending inwardly in said enlarged portion from the end thereof remote from the seating, a plunger slidable in said drilling, said plunger engaging a fixed reaction surface and a passage communicating with the inner end of said drilling and opening to the exterior of the valve member at a position to communicate with said one flow passage.

3. A control valve for controlling fluid flow between a pair of flow passages comprising a body defining a cylindrical stepped bore having wider and narrower portions, a seating defined in the bore about the narrower portion of the bore which serves as one of the flow passages, a recess defined in the wall of the wider portion of the bore adjacent said seating, said recess communicating with the other of said flow passages, a cylindrical valve member slidably mounted in and guided by the wider portion of the bore, the valve member being shaped at one end for engagement with said seating, the valve member at its opposite end extending from the wider portion of the bore and having an integral enlarged portion thereon, an axial drilling extending inwardly in said enlarged portion from the end thereof remote from the seating, a plunger slidable in said drilling, said plunger engaging a fixed reaction surface and a passage communicating with the inner end of said drilling and opening to the exterior of the valve member at a position to communicate with said one flow passage.

4. A control valve according to claim 3, in which said actuator means comprises an armature secured to the valve member, a return spring and a solenoid which can be energised to move the armature and valve member against the action of the return spring.

5. A control valve according to claim 3, in which said drilling is formed in an enlarged head of the valve member.

6. A control valve according to claim 5, in which the seat line diameter is equal to the diameter of the wider portion of the bore.

7. A control valve according to claim 6, in which the diameter of the drilling is equal to the seat line diameter and the diameter of the wider portion of the bore.

8. A control valve according to claim 6, in which the diameter of the drilling is greater than the seat line diameter and the diameter of the wider portion of the bore, whereby the valve member is pressure actuated into contact with the seating by the pressure in said one flow passage.

9. A control valve according to claim 6, characterised in that the diameter of the drilling is less than the seat line diameter and the diameter of the wider portion of the bore, whereby the valve member is pressure actuated away from the seating by the pressure in said one flow passage.

10. A control valve according to claim 5, characterised in that the seat line diameter is equal to the diameter of the drilling but is less than the diameter of the wider portion of the bore.

* * * * *